United States Patent [19]
Feinstein et al.

[11] 3,748,939
[45] July 31, 1973

[54] TRAVERSING FILM CUTTER

[75] Inventors: Sumner Sheldon Feinstein, West Peabody; Jerold Julius Golner, Lowell; Anthony Salvatore D'Amato, Chelmsford; Eugene John Trunk, North Andover, all of Mass.

[73] Assignee: Borden, Inc., Columbus, Ohio

[22] Filed: Aug. 11, 1971

[21] Appl. No.: 170,707

[52] U.S. Cl.................... 83/370, 53/390, 83/524, 83/614
[51] Int. Cl............................................. B26d 5/08
[58] Field of Search................... 83/370, 372, 614, 83/524, 484; 53/390

[56] References Cited
UNITED STATES PATENTS

| 3,540,337 | 11/1970 | Gardner | 83/614 X |
| 3,082,923 | 3/1963 | Ford et al. | 83/370 X |
| 2,670,040 | 2/1954 | Sayles | 83/484 |
| 3,633,447 | 1/1972 | Casida | 83/484 |
| 3,641,854 | 2/1972 | Keesling | 83/614 X |
| 3,146,661 | 9/1964 | Young | 83/614 X |

FOREIGN PATENTS OR APPLICATIONS 785,372 10/1957 Great Britain........................ 53/390

*Primary Examiner*—J. M. Meister
*Attorney*—George P. Maskas et al.

[57] ABSTRACT

The apparatus includes a motor; a guide rod; a blade mounted for reciprocable movement on the guide rod in response to the actuation of the motor; and an actuating bar over which film is pulled and which energizes the motor in response to the pressure applied to it by the stretched film, the blade is returned to its starting position when the pressure on the actuating bar is removed and the rotation of the motor is thus reversed.

16 Claims, 8 Drawing Figures

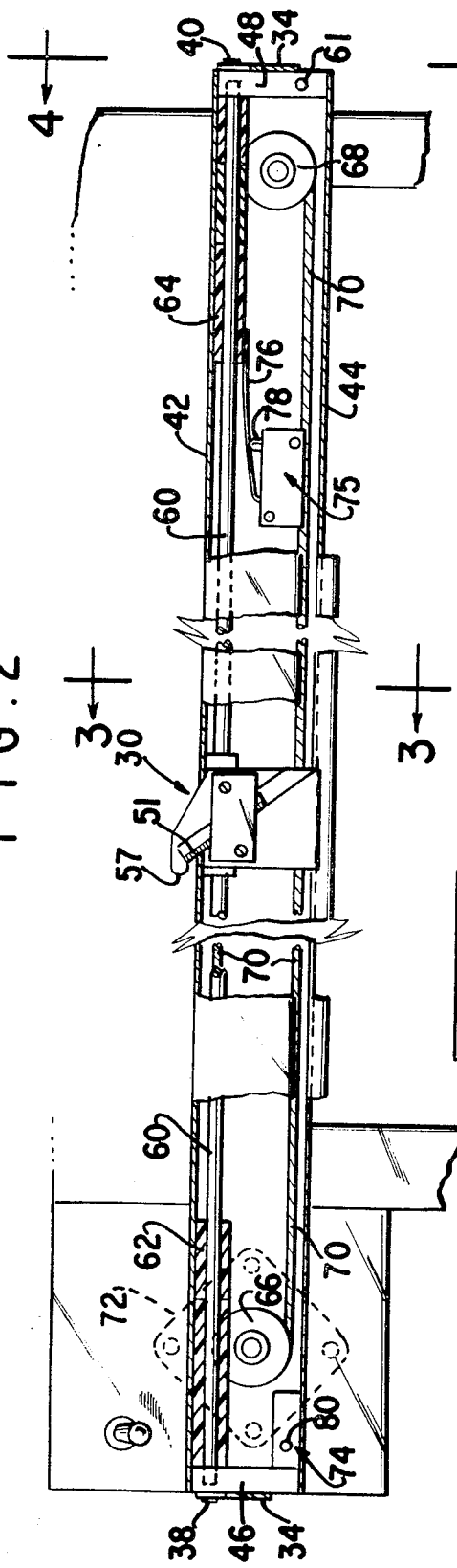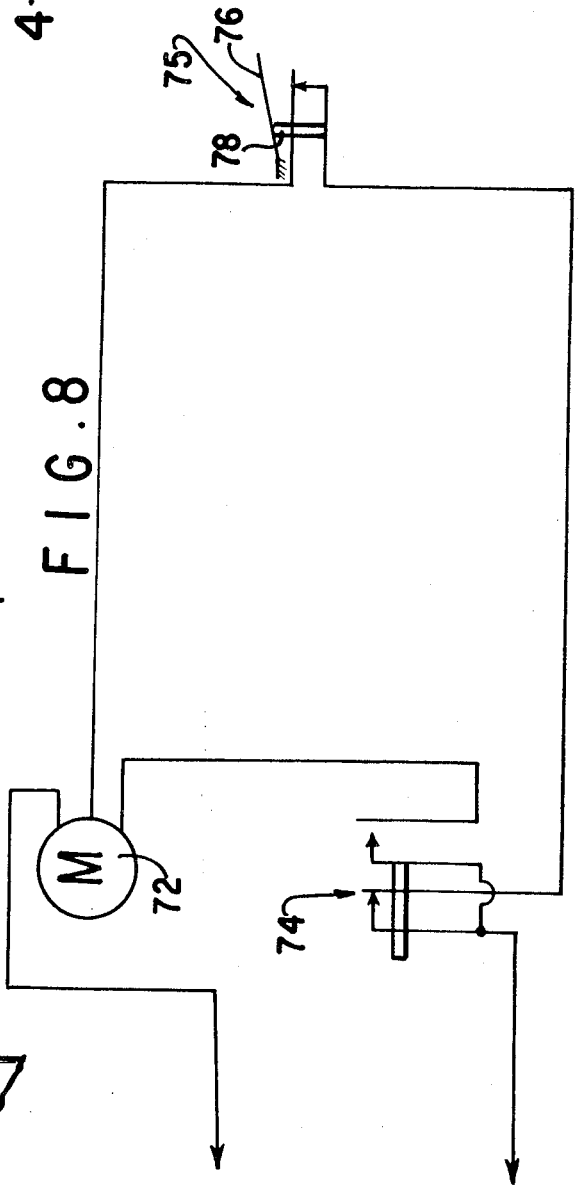

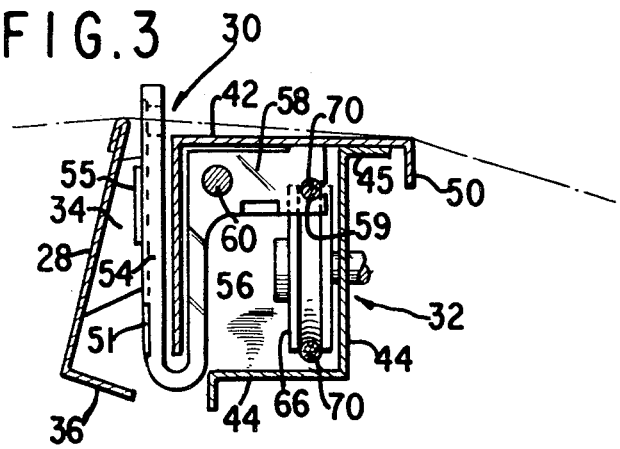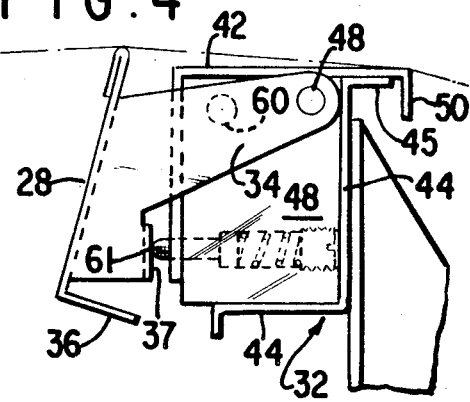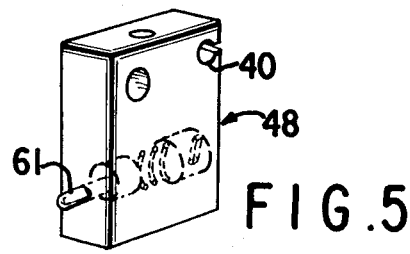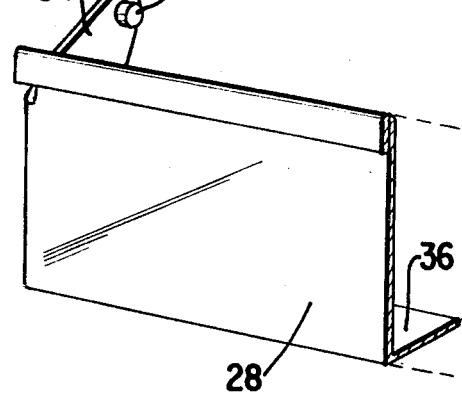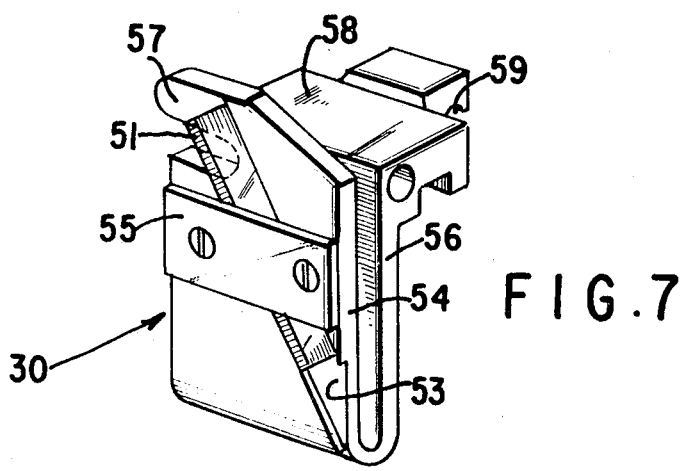

TRAVERSING FILM CUTTER

This invention relates in general to a device for facilitating the cutting and dispensing of strip material and, in particular, to a new and useful cutting device adapted specifically for cutting thin plastic film, such as polyvinyl chloride. The device comprises a knife member driven across a feed path for the film by a driving motor which is actuated by a bar when the bar is depressed by the film. When the film is cut, pressure on the bar is relieved thereby actuating the motor to return the knife member to its starting position.

The present invention is an improvement over the known devices for severing strip material or film, principally with respect to the provision of means for automatically returning the cutting blade to its initial position, and also in the arrangement which permits the simple operation of the cutting mechanism after the film is stretched over a tray for goods to be covered thereby. With the inventive device, it is a simple matter to grasp the end of a length of strip material and pull it off its supply roll as the outer end is wrapped around the tray and to thereafter move the strip material over the top of the tray and to locate the trailing portion of the film in a position over a guide channel along which a cutting knife is movable. An important feature of the invention is the provision of an actuating bar which is designed to be depressed easily by either the tray being covered or by the stretched strip of plastic material which engages over the top thereof, as the operator pulls the material away from its supply roll. The actuating bar causes a driving motor to move a cutting knife across to sever the strip material in response to being depressed and as soon as the strip material is severed, the actuating bar is released and this causes the motor to return the cutting knife to its original position. On its return, the knife actuates a micro switch which de-energizes the motor in order to reduce the impact of the knife when it slams into the abutment.

This is a mechanical cutting device which affects physical severing by means of a sharp blade maintained at ambient temperature. Since the internal elements are substantially enclosed within the housing, there is no danger of scraps of meat, or anything else that is being packaged, falling into the device thus requiring its removal. Another practical advantage of the present invention relates to the construction of the cutting device which can be easily disassembled for cleaning, examination or for replacement of parts. To remove the actuating bar, all that is required is to manually ease the pins of the actuating bar out of the recesses provided in the end blocks. As for the cover plate, all that is needed to remove it is the extraction of four screws with a screwdriver. The fact that the device is constructed of stainless steel, or other metal acceptable for food processing, also facilitates cleaning and general maintenance thereof.

Accordingly, it is an object of this invention to provide an improved device for facilitating the covering of small trays which includes a blade member actuatable by the stretching of a plastic film over a guide bar as the tray is being covered and means for immediately returning the knife to its starting position after the plastic film has been severed. It is another object to provide a simple means, particularly for applying thin polyvinyl chloride plastic film for covering disposable tray packages for food products, such as meats, with which means it is a simple matter to orient one end of the plastic film over one end of the package and to direct the remaining portion across the top to cover the product in the tray and then to position the trailing part over the actuating bar at a spaced location from the tray alongside the cutting blade whereby stretching of the film across the actuating bar depresses the bar and energizes the motor to drive the knife across and sever the film.

Accordingly, it is another object of the invention to provide an improved device for cutting strip material, particularly plastic film, which includes a movable knife driven across a feed path of the film in response to the depression of the actuating bar located adjacent the path and means for returning the knife to its starting position. A further object of the invention is to provide a device for facilitating the dispensing and cutting of sheet or strip material, particularly thin plastic film or foil, which includes means for guiding a length of the sheet material over a guide bar to permit the end thereof to be withdrawn and engaged over a tray to be covered, and an actuating bar alongside the guide bar which is depressed by tensioning the sheet to cause the blade member to move across the guide bar and cut the sheet material. A further object of the invention is to provide a device for dispensing and cutting thin plastic film which is simple in design, rugged in construction, economical to manufacture, simple to clean and which is adaptable to quick replacement of parts.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

FIG. 2 is a front planar view of the cutting device with the actuating bar and the cover plate removed;

FIG. 3 is a view of the cutting device taken along plane 3—3 in FIG. 2;

FIG. 4 is a side view of the film cutting device illustrating the relationship of the actuating bar to the yieldable means which serves to move the actuating bar away from the micro switch and the cover plate;

FIG. 5 is a perspective view of one of the end blocks;

FIG. 6 is a perspective view of the actuating bar provided with a pin at each end which are inserted into the cooperating recesses in the end blocks;

FIG. 7 is a perspective view of the blade carriage provided with a blade; and

FIG. 8 is a general diagram of the electrical circuit which activates the cutting device.

Figure 1:
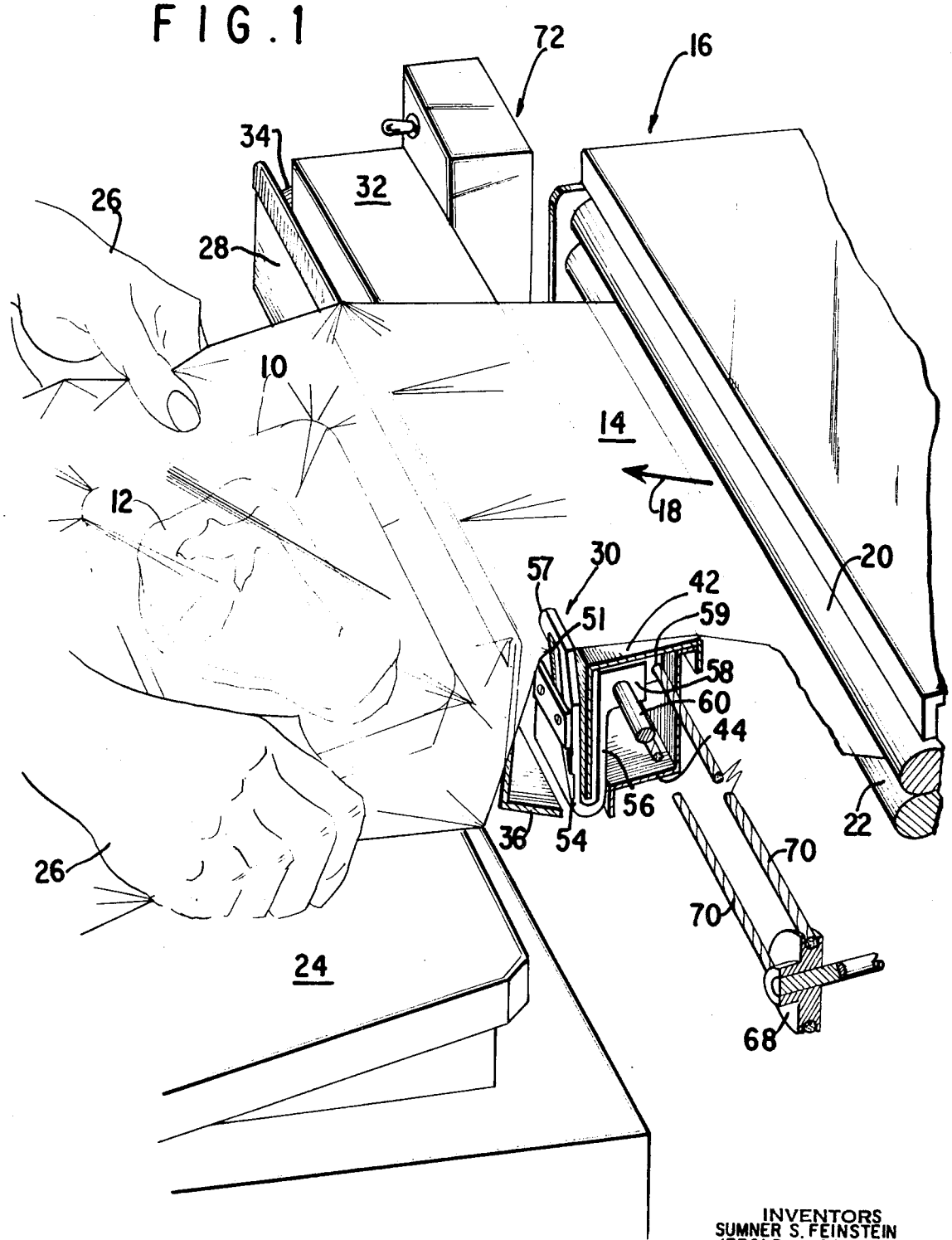
FIG. 1 is a front perspective view of the device for cutting thin sheets of various materials, especially plastic film, which may be used to cover food products disposed in trays.

Referring to the drawings in particular, the invention embodied therein comprises a device for facilitating the covering of small disposable food trays 10 which are of an inexpensive material such as pressed or foamed plastic, fiberboard and the like. The trays are adapted to contain a food product such as meat 12 which is covered with thin plastic film or foil material 14. This material is preferably a clinging type plastic film such as polyvinyl chloride.

The apparatus includes a mounting stand generally designated 16 which provides a mounting for a reel supply (not shown) of the plastic film 14 which is fed outwardly in a horizontal path indicated by the arrow 18 between guide rollers 20,22.

When tray 10 is to be wrapped or covered with a plastic film, outer marginal edges of film 14 are grasped by hands 26, indicated in dotted lines, and guided about the tray disposed on ramp 24 so that the tray is enveloped by the film. A sheet of film is then severed and the free end is brought under the tray and sealed by means of heat supplied to ramp 24.

In accordance with this invention, there is provided an automatically operable cutting mechanism located directly adjacent to ramp 24 which includes an actuating bar 28 and reciprocable blade carriage 30 mounted in housing 32. As shown in FIG. 6, actuating bar 28 has an elongated form and is provided with a pair of mounting ears 34 at its ends and a flange 36 at its bottom which extends away from the operator. In order to maintain the actuating bar away from a micro switch when the cutting device is in an inoperable condition, as will be fully described, an abutment 37 is affixed at the right lowermost portion of the actuating bar. Abutment 37 contacts a spring or a yieldable bumper and thus maintains the actuating bar spaced away from the micro switch, unless a force is applied to the actuating bar, in which case, the micro switch is actuated and the blade carriage is automatically reciprocated. Outer portions of the mounting ears 34 have affixed thereto inwardly directed pins 38, 40 which support and maintain the actuating bar in operable relationship with the cutting device, as will be described.

As is apparent from FIGS. 3 and 4, housing 32 includes cover plate 42, base plate 44 provided with flange 45, and end blocks 46,48 disposed on the base plate at its opposite ends and secured thereto by suitable means, such as screws. The cover plate 42 is L-shaped and has a depending flange 50 with one leg of cover plate 42 resting on flange 45. The base plate is also L-shaped and combines with the cover plate 42 to form an elongated box-like structure. The cover plate is affixed to the base plate and the end blocks by four screws, which can be easily removed.

FIG. 7 shows that blade carriage 30 is a U-shaped member having a pair of spaced legs 54,56 and a depending supporting lug 58 having an open recess 59. As is evident from FIG. 3, blade carriage 30 is slidably mounted on rod 60 which is supported by the end blocks 46,48 and extends from one end to the other of the cutting device. The blade carriage reciprocates on rod 60 between snubbers 62,64, shown in FIG. 2, which absorb the impact force when the blade carriage is rammed thereagainst. The snubbers are cylindrical and are slipped over the ends of the rod. Material for the snubbers is selected so that it is sufficiently resilient to absorb the force of impact. Suitable materials are plastics and rubbers.

FIG. 7 shows blade carriage 30 provided with blade 51, which can be an ordinary Schick injector blade. Blade 51 is disposed in slot 53 of the blade holder and is maintained in a position by a removable plate 55. In order to prevent cuts to the hands of the operator, the blade holder has a protruding guard 57 which prevents fingers from coming into contact with the blade.

Also mounted within the housing are a pair of spaced pulleys 66,68, which are affixed to the base plate. These pulleys are positioned at ends of the base plate and have entrained thereabout cord 70. As is best shown in FIG. 3, the blade carriage is affixed to cord 70 by means of a frictional engagement between open recess 59 in the blade carriage and the cord. This arrangement is very practical when it is desired to replace the cord in that the blade carriage can be easily detached from the cord by pulling the cord out of recess 59.

Yieldable means which maintains the actuating bar spaced away from the micro switch, and therefore, in an inactivate position, is a spring or a yieldable bumper 61 positioned at the right extremity of the cutting device in end block 48. Resilient bumper 61 cooperates with abutment 37 to position the actuating bar in spaced relationship to the micro switch.

The motive force to rotate one of the pulleys is supplied by motor 72 affixed to the rear of base plate 44. A suitable motor for this purpose is the Triem, Inc., 1/50HP, split-capacitor motor. Automatic operation of the cutting device is controlled by main micro switch 74 disposed at the left on base plate 44 and an auxiliary micro switch 75 located towards the right end and also affixed to base plate 44. Micro switch 75 includes deflector lever 76 and actuating button 78.

A simplified diagram of the circuit and the micro switches is illustrated in FIG. 8. Switch 74 has a normally open (NO) and normally closed (NC) circuits. The NO circuit, when actuated, moves the blade holder from right to left while the NC circuit, returns it to its starting position. Switch 74 is normally open and is actuated when the actuating bar contacts actuating button 80. When the main switch 74 is actuated, the NO circuit is closed and the motor is energized to move the blade carriage from right to left, as seen in FIG. 2. Snubber 62 absorbs the impact when contact with the blade holder is made, and brings it to rest. In this position, the normally closed (NC) circuit is inactive. When film is cut, pressure on the actuating bar is released and resilient bumper 61 displaces the actuating bar to its normal position away from button 80 of main micro switch 74 and actuates the NC circuit by sending a signal to the motor through the auxiliary micro switch 75, which is in NC position. The motor is energized in the reverse direction and returns the blade carriage to its starting position. On its return, blade carriage depresses button 78 of micro switch 75 by deflecting lever 76 to open the return circuit and thus de-energize the motor. Although the motor is de-energized when the blade holder traverses micro switch 75, the generated momentum slams the blade holder against snubber 64 which absorbs the shock and brings the blade holder to rest. In order to reduce the impact, deflecting lever 76 is purposely elongated and made of stiff metal to provide some restraining force. The time that it takes to move the blade holder from right to left and then back to its initial position is about 0.04 seconds.

In another embodiment of the apparatus described herein, retraction of the blade carriage is accomplished by means of a spring. This can be done in several ways, one of which involves a coil spring wound on a pulley with the free end thereof attached to the blade carriage. The motor is a one-way motor which is deactivated upon moving the blade carriage from its initial position across the feed path for the plastic film, to allow the spring to return the blade carriage to its starting position.

What is claimed is:

1. Apparatus for severing sheet material comprising an elongated cutter guide means over which the sheet material is directed in the transverse direction, a cutting means associated with said cutter guide means and movable therealong across the sheet material, a drive means connected with said cutting means for moving same along said cutter guide means to sever the sheet material, and a yieldably mounted elongated actuating member disposed parallel to the travel of said cutting means and ahead of said cutting means for energizing said drive means in response to pressure applied by the sheet material when it is pulled over said actuating member, the sheet material first passing over said cutter guide means and then over said actuating member.

2. Apparatus of claim 1, wherein said elongated member is disposed parallel to and spaced from said cutter guide means to allow said cutting means to move between said elongated member and said cutter guide means, said apparatus including a main switch which is in a normally open condition, said drive means being energized by said main switch which in turn is actuated by said elongated member to move said cutting means across the feed path of the sheet material and back to its starting position in response to de-actuation by said elongated member.

3. Apparatus of claim 2 which includes yieldable means for maintaining said actuating means in spaced relationship to said main switch, a pair of spaced pulleys and a cord stretched between said pulleys, said drive means is coupled to one of said pulleys and said cutting means is affixed to said cord and moves therewith in response to the rotation of said pulleys and movement of said cord.

4. Apparatus of claim 3 wherein said cutting means includes a blade carriage which is frictionally affixed to said cord and a blade removably secured to said blade carriage.

5. Apparatus of claim 4 including snubbers provided at both ends of said cutter guide means for absorbing the impact force of said blade carriage and an auxiliary switch disposed ahead of said blade carriage when said blade carriage is in its starting position, said auxiliary switch being provided for de-energizing said drive means when said blade carriage is returned to its starting position.

6. Apparatus of claim 5 wherein said blade carriage includes a projecting guard disposed over said blade which protects hands of an operator from said blade, said blade carriage also includes a plate for removably securing said blade to said blade carriage.

7. Apparatus of claim 6 which includes a housing within which are disposed said cutter guide means, said pulleys, said main and auxiliary switches and said snubbers, said drive means being affixed on the exterior of said housing.

8. Apparatus of claim 7 wherein said blade carriage comprises a pair of spaced parallel legs joined together at the bottom and generally corresponds to a letter U, one leg supports said blade while the other a depending lug, said depending lug has an opening which slidably accommodates said cutter guide means and a recess which serves to frictionally engage said cord.

9. Apparatus of claim 8 wherein said housing comprises four walls disposed at right angles to each other and a slot, which permits one leg of said blade carriage to enter interior of said housing, at least a portion of one of said walls being disposed between the two legs of the U-shaped blade carriage, said leg supporting said lug being disposed within said housing while said leg supporting said blade being disposed between said housing and said actuating means.

10. Apparatus of claim 9 which includes end blocks disposed within the opposite ends of said housing, each of said end blocks includes a recess; said cutter guide means is an elongated rod which is supported at both ends by said end blocks; and said elongated member includes a lateral extension at each side thereof provided with inwardly directed pins which removably fit within the recesses in said end blocks.

11. Apparatus of claim 10 wherein said housing comprises a top and a bottom mating L-shaped plate section, said top section being removably secured to said bottom section and said end blocks, said sheet material is a plastic film wound on a roll.

12. Apparatus of claim 11 wherein said drive means is a capacitor motor, said main switch is a three lead micro switch which is normally in the open condition, and said auxiliary switch is a micro switch including a resilient lever which is depressed by said blade carriage on its return to thus actuate said auxiliary switch to de-energize said drive means, said resilient lever being of sufficient stiffness to slow down said blade carriage on its return to its starting position.

13. Apparatus of claim 2 wherein said drive means is a 1/50 HP capacitor motor.

14. Apparatus for severing sheet material comprising a housing disposed transversely to the feed path of the sheet material having a pair of end walls; a pair of pulleys affixed at opposite ends within said housing; an endless cord entrained over said pulleys; drive means coupled to one of said pulleys; a normally open three-lead micro switch mounted within said housing but partially extending outside thereof for actuating said drive means; a guide bar disposed in said housing and supported by said end walls; snubbers mounted on ends of said guide bar to absorb impact force of a blade carriage; a blade carriage slidably mounted on said guide bar comprising a pair of spaced legs joined at the bottom, one leg of said blade carriage extends into said housing and has a lug provided with an opening slidably accomodating said guide bar and a recess within which is frictionally engaged said endless cord, while the other leg is disposed outside of said housing and is provided with a blade; an auxiliary micro switch mounted within said housing adjacent said blade carriage when the latter is in its starting position to de-energize said drive means when said blade carriage acutates said auxiliary micro switch on its return to the starting position; an actuating bar removably mounted on said housing and being spaced from said housing to permit said blade to travel between said housing and said actuating bar to sever the sheet material fed over said housing and said actuating bar, said actuating bar being actuated by stretching the sheet material thereover; yieldable means for maintaining said actuating bar in spaced relationship to said housing and said three-lead micro switch, said drive means is energized to move said blade carriage from one end of the apparatus to the other by displacing said actuating bar into contact with said three-lead switch, the blade carriage is returned to its starting position by permitting said actuating bar to be displaced to its original position when the sheet material is severed.

15. Apparatus of claim 14 wherein said three-lead micro switch includes a normally open and normally closed circuits, said blade carriage is returned to its original position when said actuating bar is relieved of pressure which has the effect of de-energizing the normally open circuit and of energizing the normally closed circuit to drive said blade carriage to its starting position.

16. Apparatus of claim 2 wherein said main switch is a three-lead micro switch which is in a normally open condition and is actuated by depression of said actuating member to move said cutting means across said sheet material and back to its starting position, said apparatus including an auxiliary micro switch to de-energize said drive means when said cutting means actuates it on its return to the starting position.

* * * * *